US007801951B2

(12) United States Patent
Fishkin et al.

(10) Patent No.: US 7,801,951 B2
(45) Date of Patent: Sep. 21, 2010

(54) PROCESS FOR REFERENCING, PRIORITIZING, ACCESSING, AND DISPLAYING MARGINALIA IN DIGITAL MEDIA

(75) Inventors: Robert Edward Fisher Fishkin, Stanford, CA (US); Brian Todd McKinney, Lakewood, CO (US)

(73) Assignee: Reframe-It, Inc., Stanford, CA (US)

( * ) Notice: Subject to any disclaimer, the term of this patent is extended or adjusted under 35 U.S.C. 154(b) by 123 days.

(21) Appl. No.: 11/845,413

(22) Filed: Aug. 27, 2007

(65) Prior Publication Data
US 2008/0052634 A1 Feb. 28, 2008

Related U.S. Application Data

(60) Provisional application No. 60/839,927, filed on Aug. 25, 2006.

(51) Int. Cl.
*G06F 15/16* (2006.01)
*G06F 3/00* (2006.01)
(52) U.S. Cl. ..................... 709/203; 715/733
(58) Field of Classification Search ................ None
See application file for complete search history.

(56) References Cited

U.S. PATENT DOCUMENTS

| 6,297,819 B1 | 10/2001 | Furst | 345/329 |
| 6,572,662 B2 | 6/2003 | Manohar et al. | 715/216 |
| 7,506,246 B2* | 3/2009 | Hollander et al. | 715/230 |
| 2007/0043617 A1* | 2/2007 | Stein et al. | 705/14 |
| 2007/0118794 A1* | 5/2007 | Hollander et al. | 715/512 |
| 2007/0143694 A1* | 6/2007 | Rakowski et al. | 715/760 |
| 2008/0021977 A1* | 1/2008 | Jones et al. | 709/217 |

OTHER PUBLICATIONS http://www.w3.org/2001/Annotea/, 3 pages.
http://www.annotea.org/mozilla/ubi.html, 4 pages.
Annotation Example; http://www.geof.net/code/annotation/demo/; retrieved from web on Aug. 21, 2007; 3 pages.
Marginalia Change Log; http://www.geof.net/code/annotation/CHANGES.html; retrieved from web on Aug. 22, 2007; 6 pages.
Marginalia Downloads; http://www.geof.net/code/annotation/download; retrieved from web on Aug. 22, 2007; 1 page.
Marginalia Features; http://www.geof.net/code/annotation/features; retrieved from web on Aug. 21, 2007; 1 page.
Marginalia for Moodle Screenshot; http://www.geof.net/code/annotation/screenshot; retrieved from web on Aug. 22, 2007; 1 page.
Marginalia Technical Considerations; http://www.geof.net/code/annotation/technical; retrieved from web on Aug. 22, 2007; 3 pages.

* cited by examiner

*Primary Examiner*—Yemane Mesfin
(74) *Attorney, Agent, or Firm*—St. Onge Steward Johnston & Reens LLC

(57) ABSTRACT

A system and method for providing information over a communication network among a group of computer users. Computer users are able to provide information that relates to information downloaded from the communication network. User-provided information is displayed adjacent to the relevant information from the communication network and is viewable by other computer users utilizing the system.

19 Claims, 5 Drawing Sheets

PROCESS FOR REFERENCING, PRIORITIZING, ACCESSING, AND DISPLAYING MARGINALIA IN DIGITAL MEDIA

CROSS-REFERENCE TO RELATED APPLICATIONS

The present application claims the benefit of priority under 35 U.S.C. §119(e) to U.S. Provisional Application No. 60/839,927 filed on Aug. 25, 2006, entitled "A Process For Referencing, Prioritizing, Accessing, And Displaying Marginalia In Digital Media," the entirety of which is incorporated by reference herein.

FIELD OF THE INVENTION

The present invention relates to a system and method for displaying information input by one or more computer users connected to a communication network viewable through an Internet browsing program.

BACKGROUND OF THE INVENTION

Since the inception of the Internet, many systems and methods that facilitate the communication of information between computer users have been proposed and implemented. As the ease and speed with which vast amounts of information may be sent from one computer user to another over the Internet has increased, the role of the Internet in society has increased in importance. Without a doubt, the Internet has expanded the ability of people to communicate to an extent never imagined before its inception. The Internet has allowed people of all types, with the widest variety of interests, from all corners of the globe to communicate with one another with the greatest of ease and speed.

The Internet has greatly improved two distinct aspects (among others) of the lives of computer users. First, the Internet has provided computer users with a vast amount of information that can be easily and quickly consumed. A person sitting in his or her home in Duluth, Minn. can research an innumerable number of topics by accessing information stored on the millions of servers spread around the world. Many computer users rely on the Internet to provide them up-to-the minute information about current events, weather, and the like.

A second advantage of the Internet has been the increased speed and ease with which computer users can communicate with one another. The Internet allows a computer user to send information (sometimes a very large amount of information) to be delivered to another computer user almost instantaneously. The traditional methods of communicating information between computer users over the Internet include email, web-based message boards, Internet chat rooms, instant messaging, and the like.

As is well known, an email system allows a computer user to send information to a selected number of other computer users in the form of a discrete message. The other computer user(s) can then reply with a second message and/or forward the first message to still other computer users.

Web-based message boards allow computer users to send information of various types to be 'posted' on a website such that other computer users can view the 'post' and reply if they desire. Many such message boards require users to register as members in order to view posted messages and/or reply to posted messages.

Internet chat rooms also involve a central website to which computer users must go in order to communicate with one another. In general, chat rooms allow a group of individual computer users to write messages and send them and other information to a central website to be instantly displayed to other users logged into the chat room.

Instant messaging services allow a computer user to send information instantly to one or a small number of other computer users who are also logged-in to the service at that time. The instant messaging service is often used through an application separate from a web browser, but is increasingly used within a web browser.

The foregoing methods of communication have proven instrumental in the growth of the Internet. However, there are gaps in their capabilities to efficiently spread ideas and information among groups of computer users. As an example, imagine a group of users from various parts of the world who enjoy engaging in political discussions. If one member of the group comes across a website containing information that she believes would be an interesting point of discussion within the group—an editorial column written for an online newspaper, for example—she has the following options for communicating the information to the group: 1) send an email message including her comments and the relevant weblink ("link") to be sent to the members of the group; 2) post the link on a message board along with her comments; 3) log in to a chat room to provide those members of the group who are logged in at that time with the link; and/or 4) send an instant message to those members of the group who are logged in at that time to the IM service. Each of these options has significant drawbacks.

First, with respect to email, any further comments by the group will be contained in multiple, separate email messages which will be received at various times. The "conversation" regarding the original message will be spread out and not tied in any meaningful way to the original link. Further, the information about which the first user wished to comment will not be marked in any way on the original website, meaning that other users will have to search the website for the relevant information. Second, with respect to a message board, while all of the comments that would make up a "conversation" about the link may be located in a single place (the message board), the relevant information on the original website will not be conveniently referenced at all times near the relevant discussion. Third, with respect to a chat room, since members of the group will most likely not all be logged in at the same time, the relevant discussion may take place at different times and will not be easily accessible in its entirety. Further, the relevant information on the original website will again not be conveniently referenced at all times near the discussion. Fourth, with respect to instant messaging services, any discussion on the topic will not be accessible to members of the group who are not participating in the discussion, and again there will be no convenient link between the discussion and the relevant information on the original website.

Other systems have been proposed to address these drawbacks. For example, a system entitled "Annotea" has been created which allows users to create comments to web documents (including webpages downloaded from the Internet). A user of Annotea can create a comment in reference to an entire web document or text selected from a web document, and the comment is stored either on the user's computer or a remote server accessible through the internet. When the comments are stored on a remote server, they may be accessed by other users. The comments are represented in the web document by a small, mouse-clickable link near the selected text. Once the link is clicked the comment is displayed. Users can reply to the comments of other users.

Similarly, a service called "Annozilla" allows users to create comments for webpages and their content. Annozilla utilizes frames in the web browser to provide a sidebar for displaying comments and the text on which the user commented. The side bar is located adjacent to a frame in the web browser wherein webpages are displayed. In a top portion of the sidebar, a list of the text that has been commented on in the currently loaded webpage is shown, as well as entries for each comment. When a comment entry is selected, the comment is displayed in a lower frame within the sidebar. Annozilla also allows comments to be stored on a remote server.

A third system, called "Marginalia," allows a user to create comments to webpages in a similar way as Annotea and Annozilla. Again, a user selects text on the webpage and is able to write a comment. The comment is then displayed in a margin adjacent to the selected text. When Marginalia is used in conjunction with a system called "Moodle," multiple users can see other users' comments and a summary page can display comments sorted by discussion, user, etc.

These systems, however, do not address all of the significant problems that arise in systems for coordinating the communication of large amounts of information among a group of individuals. For example, such systems tend to receive voluminous amounts of information, i.e. many comments from users. It is of course important to allow users to view the comments of others, but with many users submitting comments, a user may not always be able to easily see the comments in which he or she is most interested. Second, it is important that users have the ability to differentiate themselves from one another so that they can limit the comments displayed to them if they choose to do so. A system that is completely public will quickly have too many users submitting too many comments to allow an individual user to conveniently view the information most relevant or important to him or her.

What is needed, therefore, is a system and method that allows computer users to communicate information to other computer users regarding specific material found on a webpage in a simple and efficient manner. Such a system and method should be capable of efficiently sorting such information so that it is easily viewed and read by users. Users should have the ability to differentiate themselves so that selected comment material is more accessible than other comment material.

SUMMARY OF THE INVENTION

It is an object of the present invention to provide a system and method for providing information via a communication network that allows computer users to communicate information to other computer users regarding specific material found on a webpage in a simple and efficient manner.

It is a further object of the present invention to provide a system and method for providing information via a communication network that is capable of efficiently sorting such information so that it is easily viewed and read by users.

It is still another object of the present invention to provide a system and method for providing information via a communication network that allows users to differentiate themselves so that relevant information is more accessible to them than other information.

These and other objects are accomplished by one exemplary embodiment of the present invention, wherein a system for providing information viewable in a web browser via a communication network is provided, and comprises a server, a storage accessible by the server, and at least one user interface in communication with the server. The storage includes a plurality of user data, wherein each user data corresponds to a user of the system and at least one comment data comprising a comment created by a user of the system. The at least one user interface includes a web browser for accessing webpages via the communication network. Using the system, at least one user of the system enters at least one comment corresponding to at least one selected portion of a webpage through at least one user interface, and the at least one comment is then processed by the server and stored in the storage as comment data. Comment data stored by the storage is transmitted by the server via the communication network to at least one user interface such that at least one comment is displayed on at least one user interface in an area of a web browser proximate to the selected portion of the webpage to which the comment corresponds when the webpage is loaded by the web browser. At least one user of the system provides at least one comment rating corresponding to at least one comment displayed on a user interface and the at least one comment rating is processed by the server and stored in the storage as comment data.

In some embodiments, the server uses comment ratings to create reputation data corresponding to users of the system and stores the reputation data. In some embodiments, the server sorts comment data stored in the storage according to comment ratings to create a comment hierarchy. In some embodiments, comments corresponding to a selected portion of a webpage are displayed in an order determined by the comment hierarchy. In some embodiments, each user data corresponding to a user of the system comprises at least one user-selected preference. In some embodiments, comments corresponding to a selected portion of a webpage are displayed in an order determined by a relationship between the comment hierarchy and at least one user-selected preference.

In some embodiments, users of the system select a comment type from one of a plurality of comment types to correspond to an entered comment, and the comment type is processed by the server and stored in the storage as comment data. In some embodiments, the server sorts comment data stored in the storage according to comment type to create a comment hierarchy. In some embodiments, comments corresponding to a selected portion of a webpage are displayed in an order determined by the comment hierarchy. In some embodiments, the server filters comments entered by users of the system and deletes comments that include information that is harmful to the system. In some embodiments, at least one user interface automatically requests new comment data from the server at regular intervals for display.

According to a second exemplary embodiment of the present invention, a system for providing information viewable in a web browser via a communication network is provided, and comprises a server, a storage accessible by the server, and at least one user interface in communication with the server. The storage includes a plurality of user data, wherein each user data corresponds to a user of the system and at least one comment data comprising a comment created by a user of the system. The at least one user interface includes a web browser for accessing webpages via the communication network. Using the system, at least one user of the system enters at least one comment corresponding to at least one selected portion of a webpage through at least one user interface, and the at least one comment is then processed by the server and stored in the storage as comment data. Comment data stored by the storage is transmitted by the server via the communication network to at least one user interface such that at least one comment is displayed on at least one user interface in an area of a web browser proximate to the selected portion of the webpage to which the comment corresponds when the webpage is loaded by the web browser. The server utilizes the user data to organize the users of the system into at least one group.

In some embodiments, at least one user of the system belonging to a group receives sorted comment data from the server, wherein the sorted comment data comprises only comment data created by at least one other user of the system belonging to a group. In some embodiments, at least one user of the system provides at least one comment rating corresponding to at least one comment displayed on a user interface and the at least one comment rating is processed by the server and stored in the storage as comment data. In some embodiments, the server sorts comment data stored in the storage according to comment ratings to create a comment hierarchy. In some embodiments, comments corresponding to a selected portion of a webpage are displayed in an order determined by the comment hierarchy.

In some embodiments, each user data corresponding to a user of the system comprises at least one user-selected preference. In some embodiments, comments corresponding to a selected portion of a webpage are displayed in an order determined by a relationship between the comment hierarchy and at least one user-selected preference. In some embodiments, users of the system select a comment type from one of a plurality of comment types to correspond to an entered comment, and the comment type is processed by the server and stored in the storage as comment data. In some embodiments, the server sorts comment data stored in the storage according to comment type to create a comment hierarchy. In some embodiments, comments corresponding to a selected portion of a webpage are displayed in an order determined by the comment hierarchy. In some embodiments, at least one user interface automatically requests new comment data from the server at regular intervals for display.

According to a third embodiment of the present invention, a method for providing information via a communication network is provided, comprising the steps of: receiving at least one user data corresponding to at least one computer user via a communication network; receiving at least one comment created by at least one computer user from at least one user interface via the communication network, wherein the comment corresponds to a selected portion of a webpage; storing the at least one comment as comment data in a storage; transmitting comment data to at least one user interface for display on the at least one user interface in an area of a web browser proximate to the selected portion of the webpage to which the comment corresponds when the webpage is loaded by a web browser; receiving at least one comment rating from at least one computer user; and storing the at least one comment rating as comment data.

In some embodiments, the method further comprises the step of sorting comment data stored in the storage according to comment ratings to create a comment hierarchy. In some embodiments, the method further comprises the step of transmitting comments corresponding to a selected portion of a webpage to be displayed in an order determined by the comment hierarchy. In some embodiments, the method further comprises the step of storing at least one user-selected preference corresponding to a user of the system comprises as user data. In some embodiments, the method further comprises the step of transmitting comments corresponding to a selected portion of a webpage to be displayed in an order determined by a relationship between the comment hierarchy and at least one user-selected preference.

In some embodiments, the method further comprises the steps of receiving comment type data from at least one user interface, selected by at least one computer user from one of a plurality of comment types to correspond to an entered comment, processing the comment type, and storing the comment type in the storage as comment data. In some embodiments, the method further comprises the steps of sorting comment data stored in the storage according to comment type to create a comment hierarchy. In some embodiments, the method further comprises the steps of transmitting comments corresponding to a selected portion of a webpage to be displayed in an order determined by the comment hierarchy.

DETAILED DESCRIPTION OF THE DRAWINGS

As will be described in detail with reference to the appended drawings, the present invention relates to a system for providing information viewable in a web browser. In general, systems according to the present invention allow computer users to provide comment information relating to specific user-selected portions of webpages to be displayed in a dedicated "margin" area of the web browser. Users of the system can view comments from other users of the system simply by loading the relevant webpages on their web browsers while a particular application is running on their computers.

Figure 1:
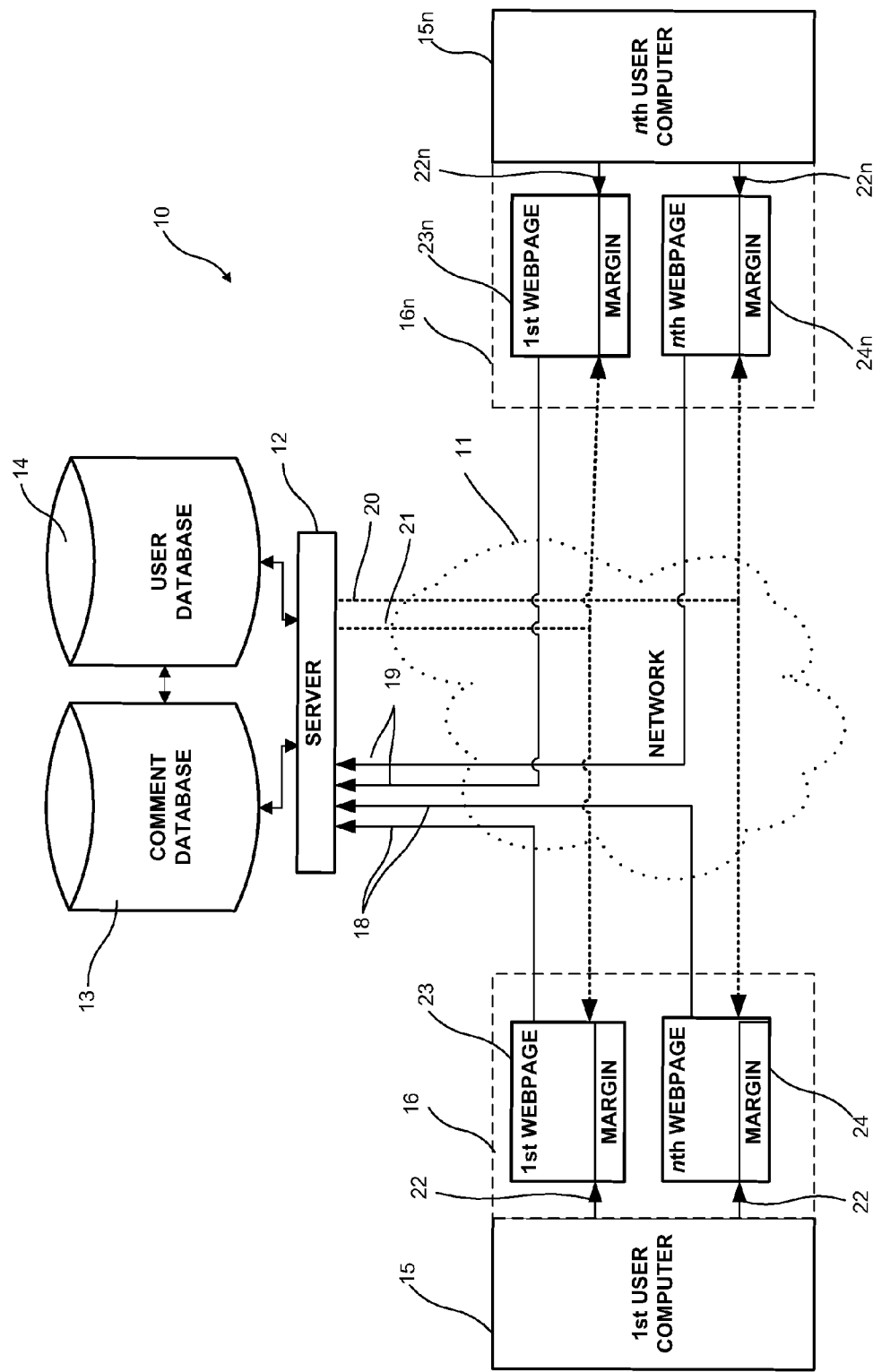
FIG. 1 is a schematic diagram of a system according to the present invention.

FIG. 1 schematically shows an exemplary embodiment of a system 10 for providing information viewable in a web browser according to the present invention. The system 10 operates through a communication network 11, and comprises a server 12, data storage means 13 and 14, and a plurality of user computers 15 and 15n. The present invention is advantageously employed using communication networks 11 of various sizes, including a network as large as the World Wide Web and as small as a local network set up in a home or business.

Each user computer 15 includes a web browsing program, schematically shown as reference numerals 16 and 16n. Examples of web browsing programs which may be utilized in embodiments of the present invention include Mozilla® Firefox®, Safari®, Microsoft® Internet Explorer®, and the like. It will be understood by one of skill in the art that systems according to the present invention to not require that each user of the system utilize the same web browser, but that different users can utilize different web browsers on the same system.

Users' computers 15 communicate with the server 12 via the network 11. Such communication is shown by arrows 18, 19, 20, and 21, as will be described in more detail below. Each user computer includes an application executing thereon as part of the system 10. Such application processes user inputs to the system 10, inputs from the server 12 and facilitates the display of the output information on the user's computer 15. Such applications utilized in embodiments of the present invention include web browser 'plugins,' applications which run independently of the web browser, and specially designed web browsers.

The server 12 communicates with the data storage means 13 and 14 directly. In some embodiments, only one data storage means is employed, as will be described in more detail below. The server 12 includes software designed to process inputs from users' computers 15 and from data storage means and to provide outputs to those elements as well as perhaps a system control interface (not shown).

Figure 2:
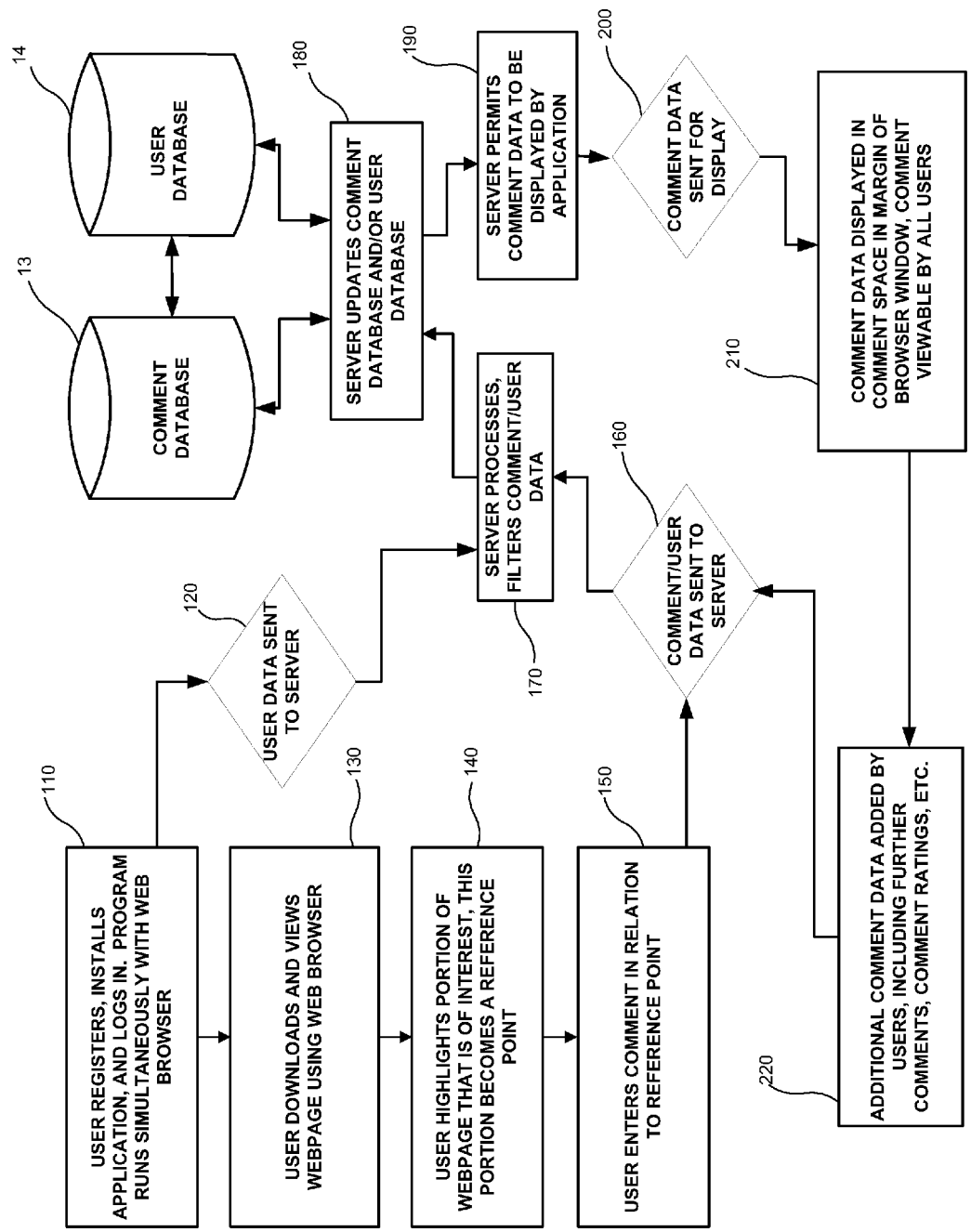
FIG. 2 is a flow chart of a method according to the present invention.

The operation of the system 10 will now be described with reference to both FIG. 1 and FIG. 2, which shows a flow chart of an exemplary method of implementing the present invention. In an advantageous embodiment of the present invention, users of the system will be required to register with the system provider. In some embodiments, the system provider utilizes an automated registration process whereby prospective users enter their information which is then stored automatically by the system. In some embodiments, registration includes selecting a username and password to be used to access or 'log in' to the system. In many embodiments, registration will also require prospective users to provide other information about themselves such as age, home address, citizenship, professional background, educational background, political affiliation, social affiliation, and the like. In the embodiment shown in FIG. 1, such information is stored by the system on storage means 14 in a user database. Such information is used to create user profiles, which are used for various purposes as described herein, including categorizing and grouping users.

At initial step 110, a first user of the system registers with the system administrator, installs the relevant application on her computer 15, logs in to the system 10, and the application runs simultaneously and in conjunction with a web browser 16. At step 120, user data is transmitted to the server 12 to be processed and stored as appropriate. At step 130, the first user, utilizing a first computer 15, views a first webpage 23, which is downloaded by the web browser 16 from a third party server (not shown) located somewhere on the communication network 11 and then displayed by the web browser 16.

Upon viewing the webpage 23, the user notices a portion of text, a picture, or other material on the webpage that piques her interest. At step 140, the user highlights the portion of the webpage that is of interest using the mouse, keyboard, or other suitable input peripheral. The highlighted portion of the webpage becomes a reference point, which is noted by the user's application. At step 150, the user is then able to enter information relating to the reference point by clicking a button on the application, by entering text into a text box, or the like. The information entered by the user is referred to herein as a 'comment.' A comment includes textual information from the clipboard or entered through a keyboard, audio files, video files, combinations of these, and the like. Arrows 22 in FIG. 1 designate comment information being input by the user into the system.

As used throughout the present specification, the phrase 'comment data' encompasses all information relating to comments that is created by the system and its users. Comment data includes such information as the comment itself created by a user, comment rating information, comment hierarchies created by the system, and the like, as these concepts are described herein.

At step 160, the comment data and any further user data is transmitted to the server 12 by the application running on a user computer 15. The transmission of comment data from a user computer 15 to the server 12 is designated by arrows 18 in FIG. 1. The comment/user data is processed and filtered by the server 12 at step 170. The software installed on server 12 is designed to filter information being input by users in order to screen out unwanted material. In some embodiments, server 12 will filter and delete comment data that contains malicious program code which is intended to disrupt operation of the server. In some embodiments, the server 12 is designed to filter out comment data that is deemed inappropriately vulgar or offensive.

After processing the comment data, the server 12 updates the comment and/or user databases as appropriate that are stored on the data storage means 13 and 14 at step 180. At step 190, the server 12 decides to permit comment data to be displayed and at step 200 the comment data is sent to users' computers for display through the web browser 16. Comment data is viewable not only by the user who entered it into the system, but also by other users who are logged into the system 10, as shown at 210 in FIG. 2. This is an important aspect of the present invention. Additional users are represented in FIG. 1 by the reference numerals ending in 'n.' The number of total users who are able to use the system 10 depends on the capabilities of the server 12, the data storage means 13 and 14, and the communication network 11. At step 220, additional comment data, comprising further comments, ratings of comments, and the like is generated by additional users and is then processed by the system 10 like the initial comment data. In this way, the system 10 allows users to build off of the ideas of other users.

The system 10 is designed, in some embodiments, to allow for private or semi-private communication. For example, the group of registered users of the system 10 form a community who may utilize the system to communicate with one another regarding whatever topics are found to be of interest to members of the community. The system 10, in some embodiments, allows the community to be organized into smaller groups according to the interests or other characteristics of the users. For example, one group could consist of users in the age range of 18-24 years old. The system 10 is designed to allow members of that (or any other) smaller group to create and post comment data that is viewable only by members of the smaller group. In such a way, users are permitted to restrict their interaction with other users of the system 10. In some embodiments, groups are formed by the system administrator, while in other embodiments, groups may also be formed by the users themselves.

Figure 3:
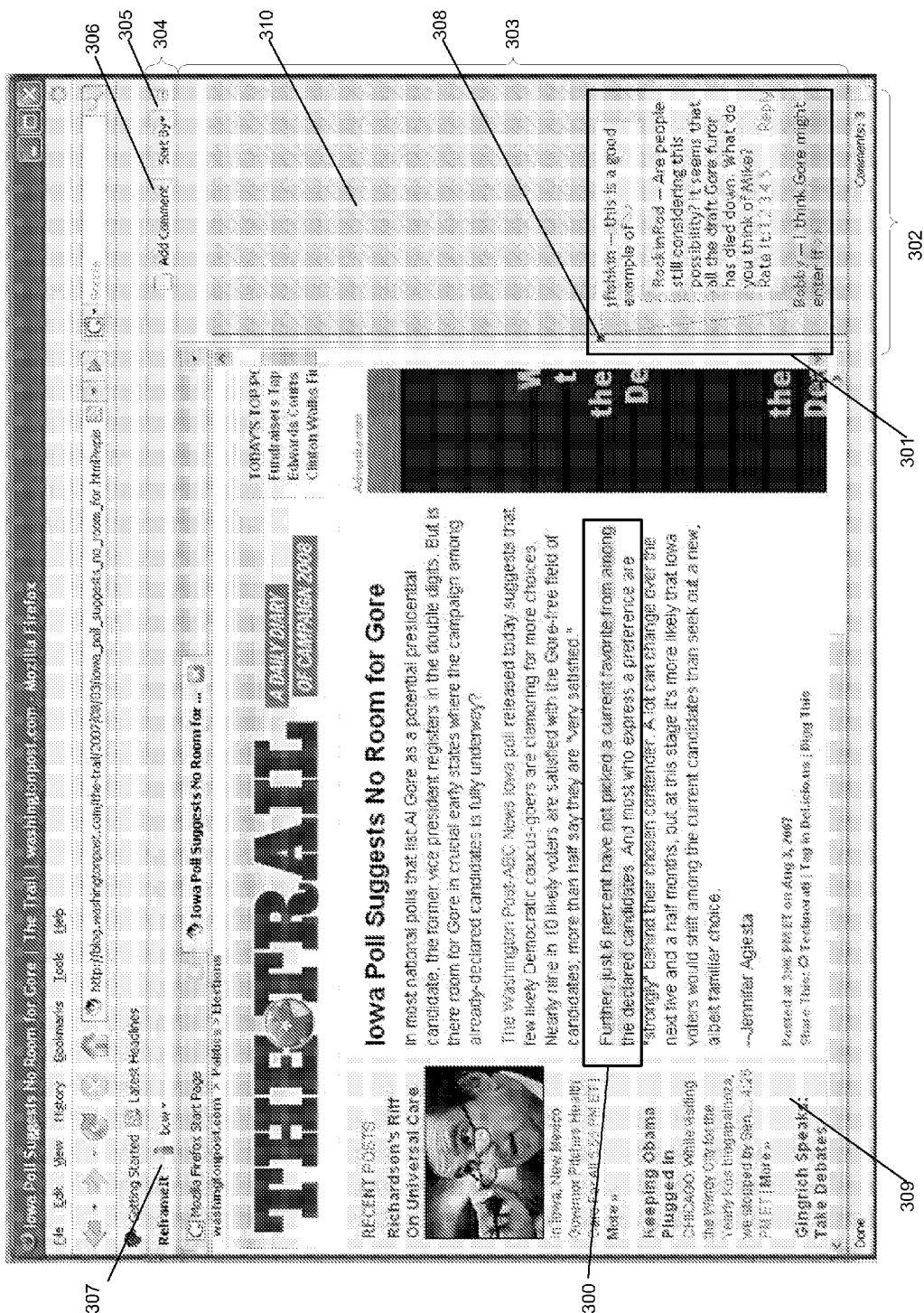
FIG. 3 is a screenshot showing an aspect of the system of FIG. 1.
Figure 4:
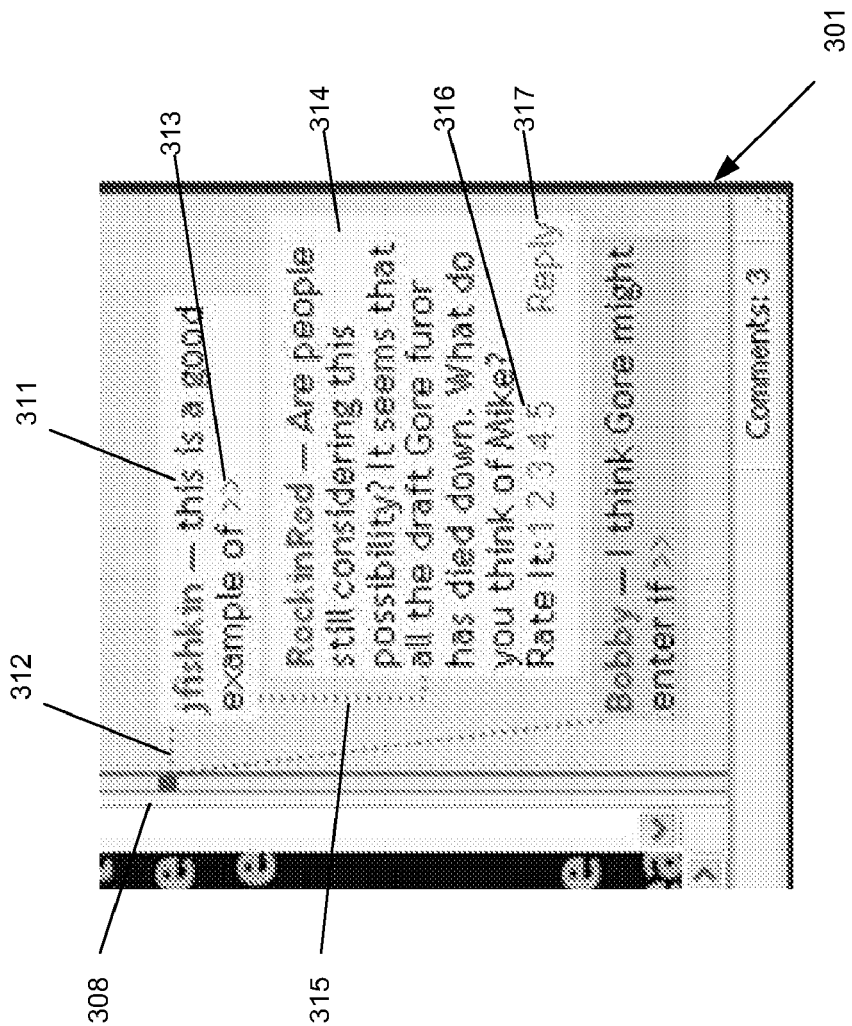
FIG. 4 is a close-up view of a portion of the screenshot of FIG. 3.

Because of the potentially large number of comments that could be generated at a single website and even at a single reference point on a website, it is of the utmost importance that the system 10 be capable of sorting comment data for presentation to the users. Accordingly, the system 10 provides a means for comments to be rated by the users and then sorted and arranged according to those ratings, the profiles of the users creating the comment or rating, and the profiles of users to whom the comments are presented. A means for comment rating is shown in FIGS. 3 and 4, which depict a screen shot of an application executing on a user's computer according to the present invention. Systems according to the present invention employ a variety of criteria for sorting comments for display. For example, users can elect to be shown only comments from people with whom they have a certain user profile characteristic in common. As another example, users can elect to be shown comments only from users who have rated a comment (comment rating is described below) in a similar way, or whose comment rating tendencies are similar.

First, FIG. 3 shows a Mozilla® Firefox® web browser window with a plugin application according to the present invention executing simultaneously therewith. A webpage 309 is shown in the large frame of the browser window. The plugin application has a horizontal toolbar 304 with various command buttons. Among the command buttons is an 'add comment' button, designated by reference numeral 306, a 'sort by' drop-down command button 305, and a 'login' button 307. The plugin application created a 'margin' space 310 on the right side of the browser window, having a width 302 and a height 303. User created comments, a group 301 of which is shown in FIG. 3, are displayed in the margin space 310.

FIG. 3 also shows a highlighted portion of text, designated by numeral 300, which is a reference point. The group of comments 301 is located adjacent to the reference point 300, and group 301 corresponds to user comments entered in relation to the information designated as reference point 300. A marker 308 located at the edge of the margin space 310 corresponds to the horizontal location of the reference point 300. In the figure, this reference point 300 was created by a user with the username 'jfishkin' by selecting the text with a computer mouse. After selecting the text, the user jfishkin clicked the add comment button 306 which caused a pop-up window to appear. The user jfishkin was then able to enter a text comment into the pop-up window using the keyboard. After entering the comment, it is displayed as shown in close-up in FIG. 4.

An advantageous feature of the system 10 is the capability to provide temporary highlighting of a reference point and/or its associated comment group when it is 'moused-over.' Essentially, some embodiments of the present invention provide that when a user moves his mouse over a reference point, the relevant text is temporarily highlighted by a bright color or the like and/or the associated comment group is similarly highlighted simultaneously. The same occurs when the user moves his cursor over a group of comments.

FIG. 4 shows a close-up of the screen shown in FIG. 3, particularly the comment group 301. The initial comment 311 is by the user jfishkin, and dotted line 312 shows that this comment 311 is linked to the marker 308 and thus was made directly in reference to the reference point 300 (not shown in FIG. 4). The arrows 313 are an expansion link which, when clicked on by a user, expand the comment box so that the full text of the comment is shown. Comment 314 is a fully expanded comment by a second user with the user name 'RockinRod.' The dotted line 315 shows that comment 314 was made in reference to the first comment 311 made by jfishkin.

Comment 314 shows a means that allows users to rate comments, designated by reference numeral 316. When a user clicks on one of the numbers 1, 2, 3, 4, or 5 the system registers and stores the rating of that comment as part of its comment data. The system collects ratings created by the users for each comment and sorts and catalogs the data in a variety of ways. Comment 314 also shows a means through which users can reply to the comments of other users, designated by reference numeral 317. When a user clicks on the 'Reply' link, he or she is presented with the comment entry popup window and may then enter his or her comment.

The ability of users to rate comments is an important feature of the present invention, particularly when a single reference point generates too many comments to be displayed easily on a computer monitor. The system 10 is capable of sorting comments in a variety of ways based on user ratings of comments and user data. For example, in some embodiments, the system 10 sorts comments and displays them based simply on which comments are the highest rated by the most users. In other embodiments, the system 10 sorts comments and displays them to a user based on the ratings given to comments by users with a profile that corresponds in some way to the viewing user's profile. The system 10 creates comment hierarchies which dictate the order in which comments are displayed on users's computers. Other types of ratings are utilized in other embodiments, such as the degree of agreement/disagreement with a comment, degree of helpfulness of a comment, and the like.

Allowing comments to be rated by users allows for a 'reputation' system for also differentiating among users. For example, if a particular user's comments are consistently highly rated by other users, the system can collect such information and store it as part of that user's data profile. This 'reputation' information can be used as further means for the system to sort comments for display on users' computers.

Although not shown in the figures, a further feature of some embodiments of the present invention is the ability to allow users to post comments which refer to multiple reference points on perhaps multiple webpages. Such a 'thread' or 'path' of comments can be followed by users through the various webpages referenced. A comment that is part of such a 'path' will have a clickable button or link that will, once clicked, show a user the next comment in the path or a list of all of the comments in the path or the like.

Figure 5:
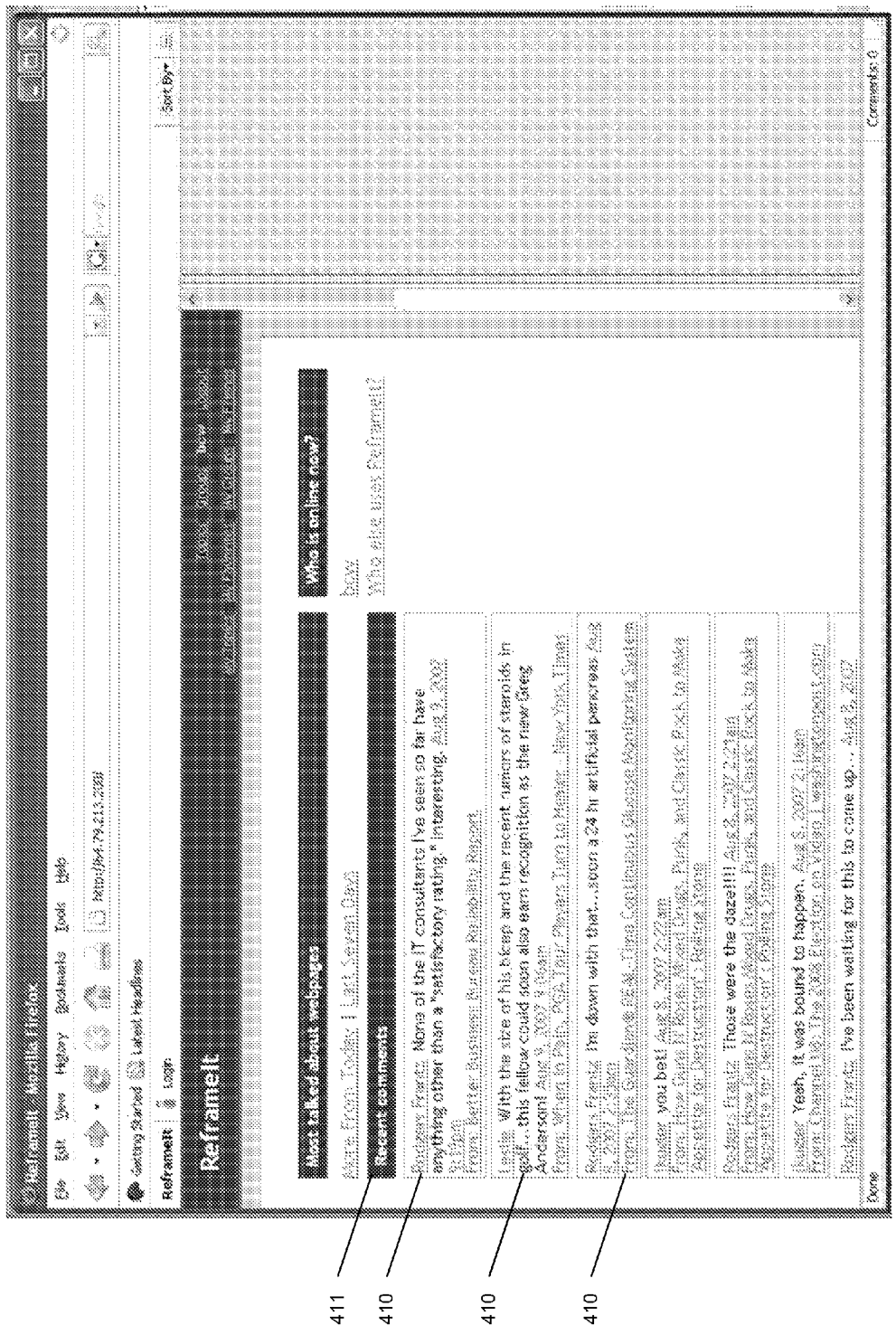
FIG. 5 is a second screenshot showing an aspect of the system of FIG. 1.

FIG. 5 shows another advantageous aspect of an exemplary embodiment of the present invention. FIG. 5 shows a screenshot of a web browser with a plugin application of a system according to the present invention executing simultaneously. The web browser in FIG. 5 has downloaded the homepage of the system 10 from the server 12. In this embodiment, the system 10 is called 'Reframelt.' Shown on the homepage is a list entitled 'Recent comments,' designated by reference numeral 411. Under this is a list of the most recently created comments 410 by all users of the system. This allows a user to browse all comments and to follow links to webpages with comments that he or she finds interesting.

A further feature of the present invention is the system 10's ability to utilize RSS or other similar technology automatically update users' computers when new comments are posted by users. A user is able to instruct the system 10 to automatically notify or display new comments for conversations that are of particular interest to the user. For example, whenever a new comment is added to thread that is of interest to a user, the user will be notified or the new comment will be automatically downloaded to the user's computer.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for providing information via a communication network, comprising:
   a server;
   a non-transitory computer-readable storage accessible by the server, including:
      a plurality of user data, wherein each user data corresponds to a user of the system; and
      at least one comment data comprising a comment created by a user of the system;
   at least one user interface in communication with the server, each user interface including:
      a web browser for accessing webpages via the communication network;
   wherein:
      a first user of the system enters a plurality of comments corresponding to one or more webpages through at least one user interface, said plurality of comments are then processed by the server and stored in the storage as comment data;

comment data stored by the storage is transmitted by the server via the communication network to at least one user interface such that the plurality of comments are displayed on at least one user interface in an area of a web browser proximate to the webpage to which said comments correspond when the webpage is loaded by the web browser;

a plurality of additional users of the system provide a plurality of comment ratings corresponding to said plurality of comments displayed on a user interface and said plurality of comment ratings are processed by the server and stored in the storage as comment data; and the server creates reputation data corresponding to the first user of the system, stores the reputation data in the storage, and uses the reputation data to sort comments for display on the at least one user interface, wherein the reputation data is based on the plurality of comment ratings corresponding to the plurality of comments made by the first user.

2. The system of claim 1, wherein users of the system select a comment type from one of a plurality of comment types to correspond to an entered comment, and said comment type is processed by the server and stored in the storage as comment data.

3. The system of claim 2, wherein the server sorts comment data stored in the storage according to comment type to create a comment hierarchy.

4. The system of claim 3, wherein comments corresponding to a webpage are displayed in an order determined by the comment hierarchy.

5. The system of claim 1, wherein the server filters comments entered by users of the system and deletes comments that include information that is harmful to the system.

6. The system of claim 1, wherein at least one user interface automatically requests new comment data from the server at regular intervals for display.

7. The system of claim 1, wherein the server utilizes the user data to organize the users of the system into at least one group and at least one user of the system belonging to a group receives sorted comment data from the server, wherein said sorted comment data comprises only comment data created by at least one other user of the system belonging to a group.

8. The system of claim 1, wherein the server sorts comment data stored in the storage according to comment ratings to create a comment hierarchy.

9. The system of claim 8, wherein comments corresponding to a webpage are displayed in an order determined by the comment hierarchy.

10. The system of claim 4, wherein each user data corresponding to a user of the system comprises at least one user-selected preference.

11. The system of claim 10, wherein comments corresponding to a webpage are displayed in an order determined by a relationship between the comment hierarchy and at least one user-selected preference.

12. A method for providing information via a communication network, comprising the steps of:

receiving a plurality of user data via a communication network corresponding to a first computer user and a plurality of additional computer users;

receiving a plurality of comments created by the first computer user from at least one user interface via the communication network, wherein said comments correspond to one or more webpaqes;

storing said plurality of comments as comment data in a storage;

transmitting comment data to at least one user interface for display on said at least one user interface in an area of a web browser proximate to the webpage to which a comment corresponds when the webpage is loaded by a web browser;

receiving a plurality of comment ratings that correspond to said plurality of comments from said plurality of additional computer users;

storing said plurality of comment ratings as comment data;

creating at least one reputation data corresponding to said first computer user based on the plurality of comment ratings that correspond to the plurality of comments made by said first computer user;

sorting said comment data stored in the storage according to said at least one reputation data to create a comment hierarchy; and displaying comment data corresponding to a webpage in an order determined by the comment hierarchy.

13. The method of claim 12, further comprising the step of storing at least one user-selected preference corresponding to said at least one additional computer user as user data.

14. The method of claim 13, wherein the step of displaying comment data further comprises the step of displaying comments corresponding to a webpage in an order determined by a relationship between the comment hierarchy and at least one user-selected preference.

15. The method of claim 12, further comprising the steps of receiving comment type data from at least one user interface, selected by at least one computer user from one of a plurality of comment types to correspond to an entered comment, processing said comment type, and storing said comment type in the storage as comment data.

16. The method of claim 15, further comprising the steps of sorting comment data stored in the storage according to comment type to create a comment hierarchy.

17. The method of claim 16, further comprising the steps of transmitting comments corresponding to a webpage to be displayed in an order determined by the comment hierarchy.

18. The method of claim 12, further comprising the steps of utilizing the user data to organize the users of the system into at least one group and transmitting sorted comment data to a user of the system belonging to a group wherein said sorted comment data comprises only comment data created by at least one other user of the system belonging to a group.

19. The system of claim 1, wherein the system automatically sends and displays a user-specified type of comment from among the comment data stored in the storage.

* * * * *